United States Patent
Shetty et al.

(10) Patent No.: US 9,148,836 B2
(45) Date of Patent: *Sep. 29, 2015

(54) METHOD AND SYSTEM FOR VERTICAL HANDOFF WITH TARGET TRAFFIC CHANNEL SETUP CONVEYED VIA SOURCE CHANNEL

(71) Applicant: Sprint Spectrum L.P., Overland Park, KS (US)

(72) Inventors: Manoj Shetty, Mumbai (IN); Sachin R. Vargantwar, Macon, GA (US); Siddharth S. Oroskar, Overland Park, KS (US); Ashvini G. Canjeevaram, Nashua, NH (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 312 days.

This patent is subject to a terminal disclaimer.

(21) Appl. No.: 13/746,928

(22) Filed: Jan. 22, 2013

(65) Prior Publication Data

US 2013/0136106 A1 May 30, 2013

Related U.S. Application Data

(63) Continuation of application No. 11/942,933, filed on Nov. 20, 2007, now Pat. No. 8,385,216.

(51) Int. Cl.
*H04W 4/00* (2009.01)
*H04W 36/14* (2009.01)
(Continued)

(52) U.S. Cl.
CPC .......... *H04W 36/14* (2013.01); *H04W 36/0066* (2013.01); *H04W 36/16* (2013.01); *H04W 36/24* (2013.01); *H04W 80/00* (2013.01); *H04W 84/12* (2013.01)

(58) Field of Classification Search
CPC ............ H04W 24/02; H04W 28/0205; H04W 28/0247; H04W 36/0027; H04W 36/0088; H04W 36/0094; H04W 36/14; H04W 36/22; H04W 72/04; H04W 74/08; H04W 80/00; H04W 84/12; H04W 88/06; H04W 92/10; H04W 36/0066; H04W 36/24
USPC .......... 370/252, 331, 338; 455/436, 446, 450, 455/509

See application file for complete search history.

(56) References Cited

U.S. PATENT DOCUMENTS 5,873,033 A 2/1999 Hjern et al.
6,034,950 A 3/2000 Sauer et al.
(Continued)

OTHER PUBLICATIONS

Boysen et al., "Proactive Handover in Heterogeneous Networks Using SIPs," IEEE Computer Society, Seventh International Conference on Networking, pp. 719-724, 2008.
(Continued)

*Primary Examiner* — Alpus H Hsu (57) ABSTRACT

A method and system for vertical handoff of a mobile station from a first-protocol RAN to a second-protocol RAN. The method and system provide a make-before-break vertical handoff, by having the first-protocol RAN (i) acquire, on behalf of the mobile station, a traffic channel assignment defining one or more traffic channel parameters for air interface communication in the second-protocol RAN, and (ii) pass to the mobile station, via the first air interface protocol, the one or more traffic channel parameters so that the mobile station can then readily switch over to communication under the second-protocol RAN. Optimally, the acquisition and passing of the one or more second-protocol traffic channel parameters may occur without the mobile station having requested the handoff, without the mobile station having asked for the traffic channel assignment, and without the mobile station having yet begun communication with the second-protocol RAN.

20 Claims, 6 Drawing Sheets

(51) Int. Cl.
*H04W 36/24* (2009.01)
*H04W 84/12* (2009.01)
*H04W 80/00* (2009.01)
*H04W 36/16* (2009.01)
*H04W 36/00* (2009.01)

(56) References Cited

U.S. PATENT DOCUMENTS

| | | | |
|---|---|---|---|
| 6,101,175 | A | 8/2000 | Schorman et al. |
| 6,701,149 | B1 * | 3/2004 | Sen et al. ............ 455/436 |
| 6,714,789 | B1 | 3/2004 | Oh et al. |
| 7,076,245 | B1 | 7/2006 | Satapathy |
| 7,437,176 | B1 | 10/2008 | Ribas et al. |
| 7,471,950 | B1 | 12/2008 | Oh et al. |
| 7,546,124 | B1 | 6/2009 | Tenneti et al. |
| 7,551,586 | B1 | 6/2009 | Yew et al. |
| 7,590,092 | B2 * | 9/2009 | Milton et al. ........ 370/331 |
| 7,738,427 | B1 | 6/2010 | Yew et al. |
| 7,782,964 | B1 * | 8/2010 | Talley et al. ........ 375/260 |
| 7,933,602 | B1 | 4/2011 | Balakrishnan et al. |
| 7,937,103 | B1 | 5/2011 | Sigg et al. |
| 7,945,281 | B1 | 5/2011 | Sigg et al. |
| 7,974,621 | B2 | 7/2011 | Zhou et al. |
| 8,010,117 | B1 | 8/2011 | Sigg et al. |
| 8,019,343 | B2 | 9/2011 | Tenneti et al. |
| 8,139,522 | B2 * | 3/2012 | Long et al. .......... 370/328 |
| 2002/0067707 | A1 | 6/2002 | Morales et al. |
| 2002/0110101 | A1 | 8/2002 | Gopalakrishnan et al. |
| 2003/0152049 | A1 | 8/2003 | Turner |
| 2004/0120283 | A1 | 6/2004 | Rezaiifar et al. |
| 2005/0130660 | A1 | 6/2005 | Park et al. |
| 2005/0202828 | A1 | 9/2005 | Pecen et al. |
| 2005/0255849 | A1 | 11/2005 | Kang et al. |
| 2006/0039329 | A1 | 2/2006 | Samuel et al. |
| 2006/0062180 | A1 * | 3/2006 | Sayeedi et al. ...... 370/328 |
| 2006/0072506 | A1 * | 4/2006 | Sayeedi et al. ...... 370/331 |
| 2006/0104228 | A1 | 5/2006 | Zhou et al. |
| 2006/0109818 | A1 * | 5/2006 | Ramanna et al. .... 370/331 |
| 2006/0126564 | A1 * | 6/2006 | Ramanna et al. .... 370/331 |
| 2006/0128371 | A1 * | 6/2006 | Dillon et al. ......... 455/423 |
| 2006/0200543 | A1 | 9/2006 | Kong et al. |
| 2006/0268756 | A1 | 11/2006 | Wang et al. |
| 2006/0268783 | A1 | 11/2006 | Julian et al. |
| 2007/0021120 | A1 * | 1/2007 | Flore et al. .......... 455/436 |
| 2007/0258436 | A1 | 11/2007 | Kulkarni et al. |
| 2007/0275737 | A1 | 11/2007 | Sakaniwa |
| 2008/0032628 | A1 | 2/2008 | Vehvilainen et al. |
| 2008/0102843 | A1 | 5/2008 | Todd et al. |
| 2008/0305799 | A1 | 12/2008 | Zuniga et al. |

OTHER PUBLICATIONS

Feng and Reeves, "Explicit Proactive Handoff with Motion Prediction for Mobile IP," IEEE Communications Society, pp. 855-860, 2004.

Lu et al., "The Study of Handoff Prediction Schemes for Resource Reservation in Mobile Multimedia Wireless Networks," IEEE Computer Society, Proceedings of the 18th International Conference on Advanced Information Networking and Application, 2004.

Lu and Wu, "Handoff Prediction by Mobility Characteristics in Wireless Broadband Networks," Proceedings of the Sixth IEEE International Symposium on a World of Wireless Mobile and Multimedia Networks, 2005.

Kastell et al., "Performance Advantage and Use of a Location Based Handover Algorithm," IEEE, pp. 5260-5264, 2004.

McNair and Zhu, "Vertical Handoffs in Fourth-Generation Multinetwork Environments," IEEE Wireless Communications, pp. 8-15, 2004.

\* cited by examiner

METHOD AND SYSTEM FOR VERTICAL HANDOFF WITH TARGET TRAFFIC CHANNEL SETUP CONVEYED VIA SOURCE CHANNEL

REFERENCE TO RELATED APPLICATION

This is a continuation of U.S. patent application Ser. No. 11/942,933, filed Nov. 20, 2007, the entirety of which is hereby incorporated by reference.

BACKGROUND

In a typical cellular radio communications system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) or packet data serving node (PDSN) for instance. The switch or gateway may then be coupled with a transport network, such as the public switched telephone network (PSTN) or a packet-switched network (e.g., the Internet).

When a mobile station (such as a cellular telephone, pager, or appropriately equipped portable computer, for instance) is positioned in a cell, the mobile station communicates via an RF air interface with the BTS antenna of the cell. Consequently, a communication path is established between the mobile station and the transport network, via the air interface, the BTS, the BSC and the switch or gateway.

With the explosive growth in demand for wireless communications, the level of call traffic in most cell sites has increased drastically over the years. To help manage the call traffic, most cells in a wireless network are usually further divided geographically into a number of sectors, each defined respectively by radiation patterns from directional antenna components of the respective BTS, or by respective BTS antennae. These sectors (which can be visualized ideally as pie pieces) can be referred to as "physical sectors," since they are physical areas of a cell site. Therefore, at any given instance, a mobile station in a wireless network will typically be positioned in a given physical sector and will be able to communicate with the transport network via the BTS serving that physical sector.

As a mobile station moves between sectors or other coverage areas of a wireless communication system, or when network conditions change or for other reasons, the mobile station may "hand off" from operating in one coverage area to operating in another coverage area. In a usual case, this handoff process is triggered by the mobile station monitoring the signal strength of signals that it is receiving in various available coverage areas, and the mobile station or the BSC determining when one or more threshold signal strength criteria are met. For instance, the mobile station may monitor signal strength in various available coverage areas and notify the BSC when a given coverage area has a signal strength that is sufficiently higher than the coverage area in which the mobile station is currently operating. The BSC may then direct the mobile station to hand off to that other coverage area.

In practice, communications over the air interface between a BTS (base station) and a mobile station will comply with a defined air interface protocol or "access technology." Numerous such protocols are well known in the art, and others will be developed in the future. Examples of existing protocols include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and Bluetooth. Each protocol may define its own procedures for handoff between coverage areas and may define other procedures and parameters related to air interface communication.

Furthermore, in some cases, more than one air interface protocol might be implemented in a given market area. For example, a given market area might provide both legacy CDMA 1xRTT coverage under a standard protocol such as EIA/TIA/IS-2000 Rel. 0, Rel. A or another version thereof (hereafter "IS-2000") and also high data rate 1xEV-DO coverage according to a standard protocol such EIA/TIA/IS-856 Rel. 0, Rel. A, or another version thereof (hereafter "IS-856"). In a system that provides two or more air interface protocols in a single area, a mobile station might not only hand off between coverage areas under a common air interface protocol (e.g., between IS-2000 sectors) but may also hand off between the different air interface protocols (e.g., between IS-2000 and IS-856) within a given physical location or when moving between locations. Handoff between different air interface protocols is known as "vertical" handoff.

OVERVIEW

To facilitate vertical handoff, a mobile station operating under one air interface protocol may periodically check for availability of service under another air interface protocol. When the mobile station detects that the signal strength provided by the other air interface protocol is sufficiently higher than signal strength provided by the current air interface protocol, the mobile station may then request a handoff to the other air interface protocol, in much the same way that a mobile station would request handoff between coverage areas of a common air interface protocol.

In certain scenarios, however, the process of vertical handoff can unfortunately disrupt an ongoing communication session, since the mobile station may need to give up its connection under one air interface protocol before searching for the availability of coverage under another air interface protocol. This problem can arise, for instance, in a hybrid IS-2000/IS-856 system. In particular, because the IS-2000 protocol was released well before the IS-856 protocol, IS-2000 does not define procedures for mobile stations to periodically search for coverage under IS-856. Consequently, when a mobile station has an active IS-2000 connection (i.e., when the mobile station has an assigned IS-2000 air interface traffic channel), the mobile station would not search for possibly better coverage under IS-856. Rather, in typical practice, it is only once the mobile station has given up its IS-2000 air interface traffic channel (e.g., transitioned from an active mode to a dormant mode under IS-2000) that the mobile station may then begin searching for better coverage under other air interface protocols (e.g., in accordance with a preferred roaming list) and then possibly engage in a vertical handoff to an IS-856.

Furthermore, in a typical hybrid system as described above, signal strength is used as the basis to trigger vertical handoff. However, a potential problem with using signal strength as the vertical handoff trigger is that signal strength is not necessarily determinative of how well a given air interface connection will perform in practice, or how well the connection will perform compared to other connections. It is possible, for instance, that a mobile station may be receiving a sufficiently high signal strength to justify handoff from a first air interface protocol to a second air interface protocol but that the mobile station might actually be able to communicate at a higher data rate under the first protocol than under the second protocol. In that case, notwithstanding the signal strength comparison, it may make more sense for the mobile station to remain under the first air interface protocol rather than handing off to the possibly slower second air interface protocol.

Disclosed herein is a method and system for improved vertical handoff, preferably helping to overcome some or all of the aforementioned problems.

In particular, this document describes an innovative method and system for vertical handoff of a mobile station from a first-protocol RAN to a second-protocol RAN. The method and system provide a make-before-break vertical handoff, by having the first-protocol RAN (i) acquire, on behalf of the mobile station, a traffic channel assignment defining one or more traffic channel parameters for air interface communication in the second-protocol RAN, and (ii) pass to the mobile station, via the first air interface protocol, the one or more traffic channel parameters so that the mobile station can then readily switch over to communication under the second-protocol RAN. Optimally, the acquisition and passing of the one or more second-protocol traffic channel parameters may occur without the mobile station having requested the handoff, without the mobile station having asked for the traffic channel assignment, and without the mobile station having yet begun communication with the second-protocol RAN.

These as well as other aspects, advantages, and alternatives will become apparent to those of ordinary skill in the art by reading the following detailed description, with reference where appropriate to the accompanying drawings. Further, it should be understood that the description provided in this overview and elsewhere in this document is intended to characterize the present method and system by way of example only.

DETAILED DESCRIPTION

1. Exemplary Implementation

The present method is operable in a system having at least two radio access networks (RANs) (or radio access systems) that serve air interface traffic channels defined by disparate air interface protocols, such as IS-2000 and IS-856 for instance (or any other combination of air interface protocols now known or later developed). In particular, one RAN provides air interface traffic channels according to one air interface protocol (e.g., IS-2000) and another RAN provides air interface traffic channels according to a different air interface protocol (e.g., IS-856). The RANs may be physically co-located in an overlay arrangement for instance, sharing a common base station tower/antennas and other equipment and having separate channel cards/units and associated logic for each air interface protocol. Alternatively, the RANs may be more separate, with respective base stations for instance.

According to the exemplary method, when the mobile station has an assigned air interface traffic channel with the first RAN under the first air interface protocol (hereafter a "first protocol traffic channel"), the first RAN will detect a handoff trigger and will autonomously and automatically orchestrate a handoff of the mobile station to an air interface traffic channel on the second RAN under the second air interface protocol (hereafter a "second protocol traffic channel"). Advantageously, this will occur without the mobile station requesting the handoff and without the mobile station requesting the assignment of a second protocol traffic channel, as the first RAN will instead request and obtain advanced assignment of the second protocol traffic channel on behalf of the mobile station.

More particularly, when the first RAN detects the handoff trigger, the first RAN will itself ask the second RAN to assign a second protocol traffic channel for use by the mobile station. In response, the second RAN will then assign a second protocol traffic channel for the mobile station and will provide the first RAN with one or more parameters defining the assigned second protocol traffic channel. Optimally, the one or more parameters would be the same parameters that the second RAN would have given directly to the mobile station if the mobile station had itself asked the second RAN to assign a second protocol traffic channel. However, with the exemplary method, the mobile station need not request assignment of the second protocol traffic channel, since the first RAN makes that request on behalf of the mobile station.

After the first RAN receives from the second RAN the one or more parameters defining the assigned second protocol traffic channel, the first RAN will then transmit the one or more parameters via the first protocol traffic channel to the mobile station. Upon receipt of the one or more parameters, the mobile station will then switch over to communicate on the second protocol traffic channel as defined by the one or more parameters. Advantageously, the mobile station may thus quickly handoff from one air interface protocol to another even in a scenario where the mobile station itself would normally not search for coverage under the other protocol.

For instance, if the mobile station has an active IS-2000 radio link, the IS-2000 RAN serving the mobile station may determine that the mobile station should hand off to an IS-856 RAN. In response, the IS-2000 RAN may then itself (i.e., without involving the mobile station, though not necessarily without involvement of other network equipment) ask the IS-856 RAN to assign an IS-856 traffic channel for use by the mobile station. And in response, the IS-856 RAN may assign an IS-856 traffic channel for use by the mobile station and may provide the IS-2000 RAN with one or more parameters (e.g., a Unicast Access Terminal Identifier (UATI), and a Media Access Control (MAC) ID, in addition to basic RF channel information such as carrier frequency or the like) that define the assigned IS-856 traffic channel. The IS-2000 RAN may then simply transmit the one or more second protocol traffic channel parameters to the mobile station via the mobile station's existing IS-2000 traffic channel. And upon receipt of the one or more parameters, the mobile station may then readily switch over to communicate on the IS-856 traffic channel defined by the provided parameter(s). With this process, a seamless "make before break" handoff from IS-2000 to IS-856 can thereby be accomplished.

In the exemplary method, the handoff trigger detected by the first RAN is preferably a data-rate based handoff trigger. For instance, the trigger may be a determination that the mobile station would likely have sufficiently higher data rate (e.g., forward link data rate) under the second air interface protocol than the mobile station has had under the first air interface protocol. To make this determination, the first RAN may maintain a record of the data rate that the mobile station has been obtaining under the first air interface protocol, and the first RAN may use signal strength reports from the first mobile station under the first air interface protocol as a basis to predict what data rate the mobile station is likely to obtain upon handoff to the second air interface protocol. The first RAN may then compare the actual data rate with the predicted data rate and, if the predicted data rate exceeds the actual data rate by a threshold extent, the first RAN may determine that the mobile station should hand off to the second air interface protocol.

Continuing with IS-2000 and IS-856 as an example, for instance, the IS-2000 RAN may maintain a record of the data rate at which the IS-2000 RAN has actually transmitted data to the mobile station over the past several seconds (or over any defined time period, possibly as a rolling average). Further, the IS-2000 RAN may collect pilot strength management messages transmitted from the mobile station as indications of the mobile station's received IS-2000 signal strength over time, and the IS-2000 RAN may map that received signal strength to a likely forward link data rate under IS-856. The IS-2000 RAN may then compare the actual IS-2000 data rate with the predicted IS-856 data rate. And if the comparison shows that the predicted IS-856 data rate is at least a threshold higher (e.g., higher at all) than the actual IS-2000 data rate, then the IS-2000 RAN may deem handoff to IS-856 to be triggered. Furthermore, other metrics could be taken into account as well or instead.

Accordingly, in one respect, an exemplary method may involve, while a mobile station has a first protocol traffic channel served by a first RAN, the first RAN detecting a handoff trigger and responsively (i) requesting the second RAN to assign a second protocol traffic channel for the mobile station, (ii) receiving from the second RAN one or more parameters defining the second protocol traffic channel assigned by the second RAN for the mobile station, and (iii) transmitting to the mobile station via the first protocol traffic channel the one or more parameters without the mobile station having requested assignment of the second protocol traffic channel. Optimally, the one or more parameters are usable by the mobile station to readily switch over from communication on the first protocol traffic channel to communication on the second protocol traffic channel.

In this exemplary method, the first air interface protocol may comprise an air interface protocol according to which a served device having an active air interface connection does not search for coverage under the second air interface protocol. For instance, the first air interface protocol may comprise IS-2000 (i.e., any version or variant of IS-2000) and the second air interface protocol may comprise IS-856 (i.e., any version or variant of IS-856). Further, the one or more parameters may comprise a UATI and a MAC ID. As such, the first RAN may send a UATI Request to the second RAN and obtain the UATI in a UATI Assignment from the second RAN. Likewise, the first RAN may send a Connection Request to the second RAN and may receive the MAC ID in response from the second RAN.

In the exemplary method, the first RAN includes a BSC that controls air interface communications according to the first air interface protocol and is communicatively linked with a transport network. Likewise, the second RAN includes a radio network controller (RNC) that controls air interface communications according to the second air interface protocol and is communicatively linked with the transport network. (The terms BSC and RNC can also be used interchangeably, but are used separately here at least in part to emphasize that one entity provides control functions for the first RAN and the other entity provides control functions for the second RAN.)

The first RAN and second RAN may be provided in an overlay configuration if desired, such as where the two RANs share common hardware and logic. For instance, the two RANs may share a common base station tower and antennas and may share other equipment as well. Further, hardware and other aspects of the BSC and RNC can be combined together if desired.

In operation, the BSC may perform the functions of detecting the handoff trigger and then, through a communication path (e.g. network or internal logic) provided between the BSC and RNC for instance, (i) requesting the RNC to assign the second protocol traffic channel for the mobile station and (ii) receiving the one or more parameters from the RNC. The BSC and RNC may also both be in communication with a common PDSN, and the PDSN may buffer data destined to the mobile station during the handoff process, to make the handoff process more seamless. Likewise, the BSC and RNC may both be in communication with a common switch (e.g., MSC or media gateway system), and the switch may similarly facilitate handoff.

As noted above, the handoff trigger may comprise a data-rate based handoff trigger. In that case, the function of detecting the handoff trigger may comprise (i) determining actual data rate for the mobile station on the first air interface protocol, (ii) predicting data rate for the mobile station on the second air interface protocol, and (iii) comparing determined actual data rate with the predicted data rate and determining that the predicted data rate exceeds the determined actual data rate by a threshold.

Further, the function of predicting data rate for the mobile station on the second air interface protocol may involve (a) determining signal strength received by the mobile station on the first air interface protocol and (b) mapping the determined received signal strength on the first air interface protocol to a prediction of data rate on the second air interface protocol. More particularly, determining signal strength received by the mobile station on the first air interface protocol may comprise determining $E_c/I_o$ based on pilot strength management messages received from the mobile station for the first air interface protocol. In turn, mapping the determined received signal strength on the first air interface protocol to the prediction of data rate on the second air interface protocol may comprise mapping the determined $E_c/I_o$ to a C/I value, and mapping the C/I value to a data rate value in accordance with mapping data defined by the second air interface protocol.

In another respect, the exemplary method may be operable in a wireless communication system having a plurality of RANs serving air interface traffic channels defined by disparate air interface protocols, including a first RAN having a BSC and serving air interface traffic channels according to IS-2000 and a second RAN having an RNC and serving air interface traffic channels according to IS-856 (IS-856 traffic channels). The exemplary method may then involve carrying out various functions while a mobile station has an IS-2000 traffic channel served by the first RAN.

First, the BSC may make a determination that the mobile station would likely experience a threshold higher data rate under IS-856 than the mobile station has been experiencing under IS-2000. Responsive to that determination, the BSC may then request the RNC to provide an assignment of an IS-856 traffic channel for the mobile station, without the mobile station having requested the assignment, i.e., the BSC may do so autonomously on behalf of the mobile station. The RNC may then responsively assign an IS-856 traffic channel for the mobile station and provide the BSC with at least a MAC ID (and perhaps a UATI) for the assigned IS-856 traffic channel, and the BSC may then transmit at least the MAC ID to the mobile station via the mobile station's existing IS-2000 traffic channel. The mobile station may then use at least the MAC ID to readily begin communication on the assigned IS-856 traffic channel, such as by receiving and processing communications transmitted over the air to that MAC ID.

In yet another respect, an exemplary radio access system is operable to serve a mobile station with an air interface traffic channel defined by a first air interface protocol (first protocol traffic channel) and to facilitate vertical handoff as described herein. In practice, the radio access system may include at least one antenna structure for engaging in air interface communication with the mobile station, and control logic (e.g., processor executed machine language instructions, and/or other forms of control logic) for controlling one or more aspects of the air interface communication.

The control logic may be operable to assign the first protocol traffic channel to the mobile station. Further, the control logic may be operable to detect a handoff trigger and to responsively (i) request another radio access system to assign for use by the mobile station an air interface traffic channel defined by a second air interface protocol (second protocol traffic channel), (ii) receive from the other radio access system one or more parameters defining the second protocol traffic channel assigned by the second radio access system for use by the mobile station, and (iii) transmit to the mobile station via the first protocol traffic channel the one or more parameters without the mobile station having requested assignment of the second protocol traffic channel. Again, the one or more parameters would then be usable by the mobile station to readily switch over from communication on the first protocol traffic channel to communication on the second protocol traffic channel.

As with the embodiments described above, the first air interface protocol could be IS-2000 and the second air interface protocol could be IS-856. The one or more parameters could then include a UATI and a MAC ID. Alternatively, other air interface protocols could be implemented, possibly with other sorts of parameters defining the second protocol traffic channel.

Also as described above, the radio access system may include a BSC and the other radio access system may include an RNC (although these names could again be interchangeable). In that case, the control logic may be disposed in the BSC. Further, the BSC and RNC may both be communicatively linked with a common PDSN. In an exemplary arrangement, the radio access systems could be provided in an overlay configuration, such as by sharing one or more common base stations and having separate channel cards or channel modules for supporting disparate air interface protocols such as IS-2000 and IS-856 for instance.

Furthermore, as in the above embodiments, the handoff trigger may be a data-rate based handoff trigger. For instance, the control logic may detect the handoff trigger by comparing actual data rate provided to the mobile station under the first air interface protocol with predicted data rate for the mobile station under the second air interface protocol. More particularly, the control logic may (i) determine the actual data rate provided to the mobile station under the first air interface protocol, (ii) determine an $E_c/I_o$ for the mobile station under the first air interface protocol, (iii) map the $E_c/I_o$ to a C/I for the mobile station, (iv) map the C/I to the predicted data rate under the second air interface protocol, and (v) compare the predicted data rate with the determined actual data rate to determine whether the predicted data rate exceeds the determined actual data rate by at least a threshold extent, which may constitute or form a basis of the handoff trigger.

Figure 1:
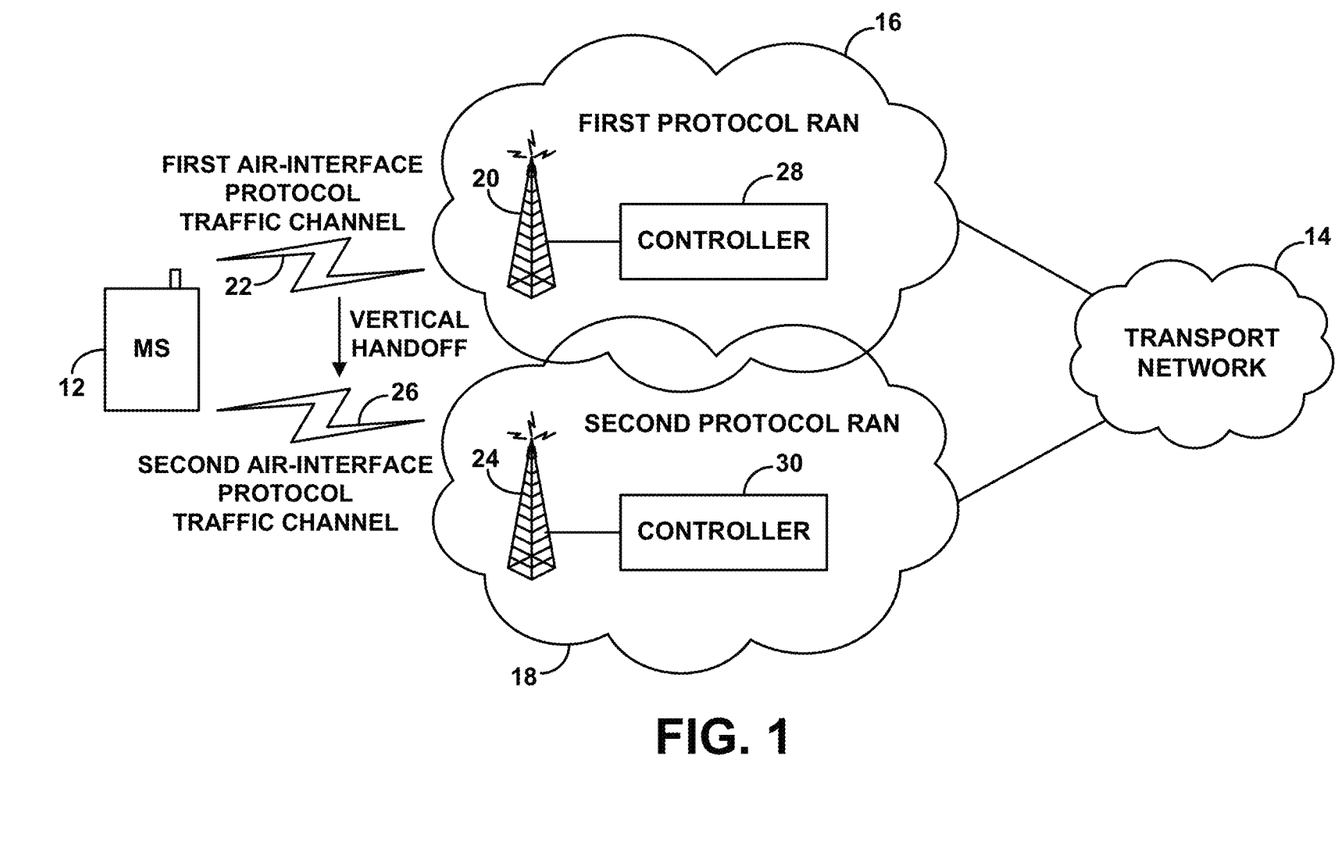
FIG. 1 is a simplified block diagram of a system in which the exemplary method can be implemented.

Referring to the drawings, FIG. 1 is a generalized block diagram depicting a system in which the exemplary method can be implemented. As shown, the system includes multiple radio access networks each operable to serve a representative mobile station 12, for instance, such as to provide the mobile station 12 with connectivity to a transport network 14 (e.g., the PSTN and/or the Internet). Two representative radio access networks are shown: (i) a first protocol RAN 16 that operates according to a first air interface protocol and is thus operable to serve mobile station 12 with a first protocol traffic channel, and (ii) a second protocol RAN 18 that operates according to a second air interface protocol and is thus operable to serve mobile station 12 with a second protocol traffic channel.

Each RAN is shown including at least one base station (or access point), which has an antenna structure and associated hardware or logic for radiating to define a radio frequency (RF) air interface through which the mobile station 12 can communicate with the RAN. In particular, RAN 16 is shown including a base station 20 that radiates to define an air interface 22 compliant with the first air interface protocol, and RAN 18 is shown including a base station 24 that radiates to define an air interface 26 compliant with the second air interface protocol. Further, each RAN is shown including a respective controller (or control logic), which could equally be integrated with a base station. In particular, RAN 16 is shown including a controller 28, and RAN 18 is shown including a controller 30.

As noted above, the two exemplary RANs could be provided in an overlay configuration, such as in a scenario where a wireless service provider has upgraded service in a particular area to provide an advanced wireless access technology while also retaining the legacy technology to serve older subscriber devices for instance. In practice, the RANs could share a common base station (perhaps common antenna structure) and a common controller. However, in a likely scenario, each RAN would function with its own channel cards or other logical channel modules to provide air interface communications according to the protocol of the RAN. For instance, a common controller or base station may include a chassis holding channel cards each operable to support one or more air interface traffic channels according to a designated air interface protocol. Thus, one channel card may provide for communication according to the first air interface protocol, including assignment of first protocol traffic channels, and another channel card may provide for communication according to the second air interface protocol, including assignment of second protocol traffic channels.

It should be understood that the arrangement of FIG. 1 and other arrangements and functions described herein are intended to illustrate the present method and system by way of example only and not by way of limitation. Thus, numerous changes can be made to the arrangements and functions described, including addition, deletion, re-ordering, combining, distribution, or other modifications of components. Furthermore, where this description refers to functions being carried out, it is well understood that the functions can be implemented using software (e.g., a processor (one or more processors) executing machine language instructions), hardware, and/or firmware. For instance, many of the functions described as being carried out by the first protocol RAN can be carried out by a processor of controller 28 executing corresponding machine language instructions written by a programmer.

Figure 2:
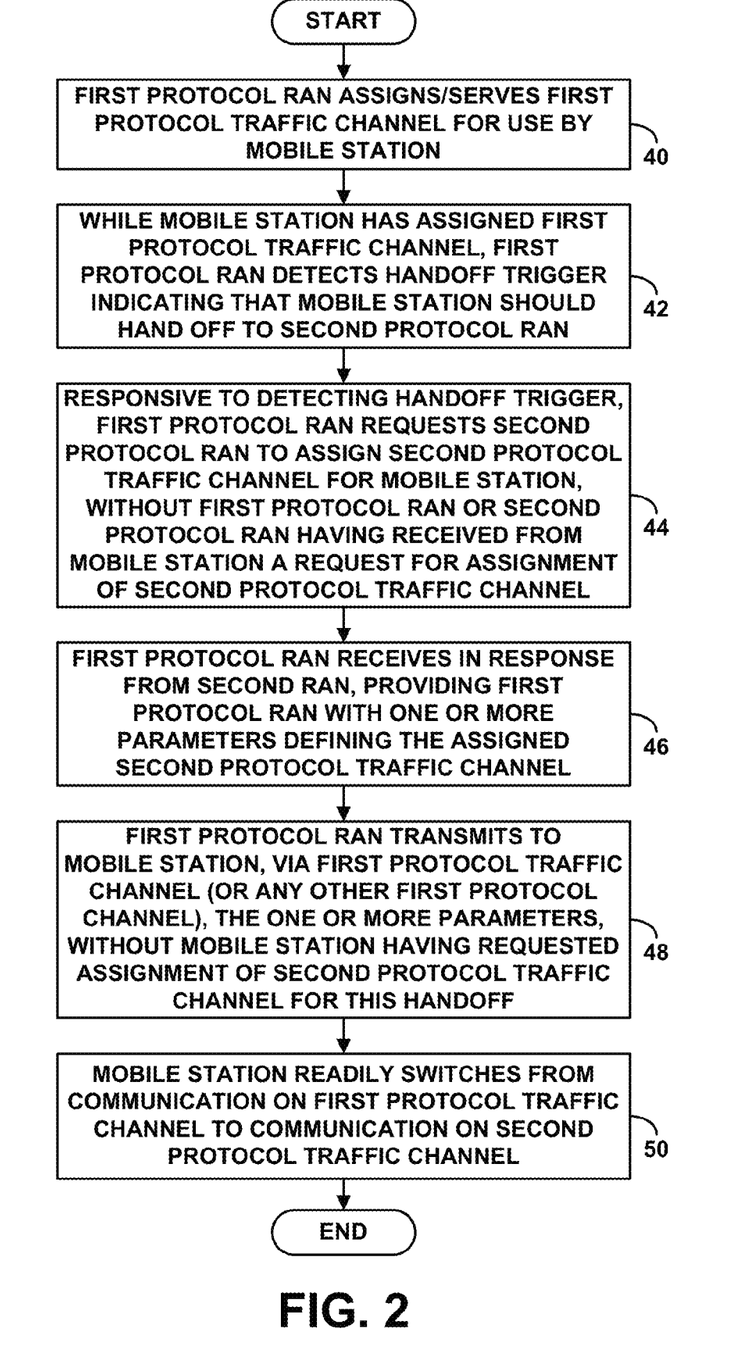
FIG. 2 is a flow chart depicting functions that can be carried out in the system of FIG. 1.

Referring next to FIG. 2, a generalized flow chart is provided, depicting functions that can be carried out in the arrangement of FIG. 1, in accordance with the exemplary method. As shown in FIG. 2, at step 40, the first protocol RAN 16 assigns/serves a first protocol traffic channel for use by the mobile station 12. At step 42, while the mobile station 12 has the assigned first protocol traffic channel, the first protocol RAN detects a handoff trigger indicating that the mobile station 12 should hand off to the second protocol RAN. For instance, the first protocol RAN may detect that the mobile station 12 would likely experience a threshold higher data rate under the second air interface protocol than under the first air interface protocol.

At step 44, in response to detecting the handoff trigger, the first protocol RAN then requests the second protocol RAN to assign a second protocol traffic channel for the mobile station 12, without the first protocol RAN or second protocol RAN having received from the mobile station 12 a request for the assignment of a second protocol traffic channel. That is, the first protocol RAN autonomously does so on behalf of the mobile station 12, to obtain the second protocol traffic channel assignment and convey the assignment to the mobile station. In the arrangement shown in FIG. 1, the function of the first protocol RAN requesting the second protocol RAN to assign the second protocol traffic channel for the mobile station 12 may involve the controller 28 requesting the controller 30 to assign the second protocol traffic channel for the mobile station 12.

At step 46, the first protocol RAN then receives a response from the second RAN, providing the first protocol RAN with one or more parameters defining the assigned second protocol traffic channel, where those parameters would be sufficient to enable the mobile station 12 to tune to and use the assigned second protocol traffic channel. At step 48, the first protocol RAN then transmits to the mobile station via the first protocol traffic channel the one or more parameters, without the mobile station 12 having requested assignment of the second protocol traffic channel for this handoff. At step 50, upon receipt of the one or more parameters, the mobile station 12 then readily switches from communication on the first protocol traffic channel to communication on the second protocol traffic channel. Meanwhile, infrastructure of (or associated with) the two radio access networks can buffer data that would be sent to the mobile station 12, in an effort to ensure that any data being sent to the mobile station on the first protocol traffic channel will instead be sent to the mobile station on the second protocol traffic channel.

The radio access networks 14, 16 of FIG. 1 can take any of a variety of forms, as can the mobile station and other components. A rudimentary RAN, for instance, could take the form of a simple wireless access point router (e.g., a Wi-Fi access point router) coupled with a local area network. Alternatively, the RAN can be more complex, such as a cellular wireless network including one or more base stations, controllers, switches, gateways, and/or other components now known or later developed.

Likewise, the mobile station can take various forms, examples of which include a mobile phone, a personal digital assistant, a wirelessly equipped personal computer, or another wirelessly equipped device of any sort, preferably compliant with at least the first air interface protocol and the second air interface protocol. In preferred operation, the mobile station may be engaged in a communication session, such as a voice call (circuit or packet based) or data session, on the first protocol traffic channel when the first protocol RAN orchestrates a handoff of the mobile station to the second protocol traffic channel in the manner described.

2. IS-2000/IS-856 Example Implementation

As discussed above, the present method is particularly advantageous in the context of hybrid IS-2000/IS-856 communications. Therefore, the remainder of this description will focus on that scenario, and particularly vertical handoff of wireless packet data communications between such air interface protocols. Nevertheless, it should be understood that the method can apply in other hybrid systems as well, with respect to other air interface protocols for instance.

a. Cellular Wireless Packet Data Communications

Figure 3:
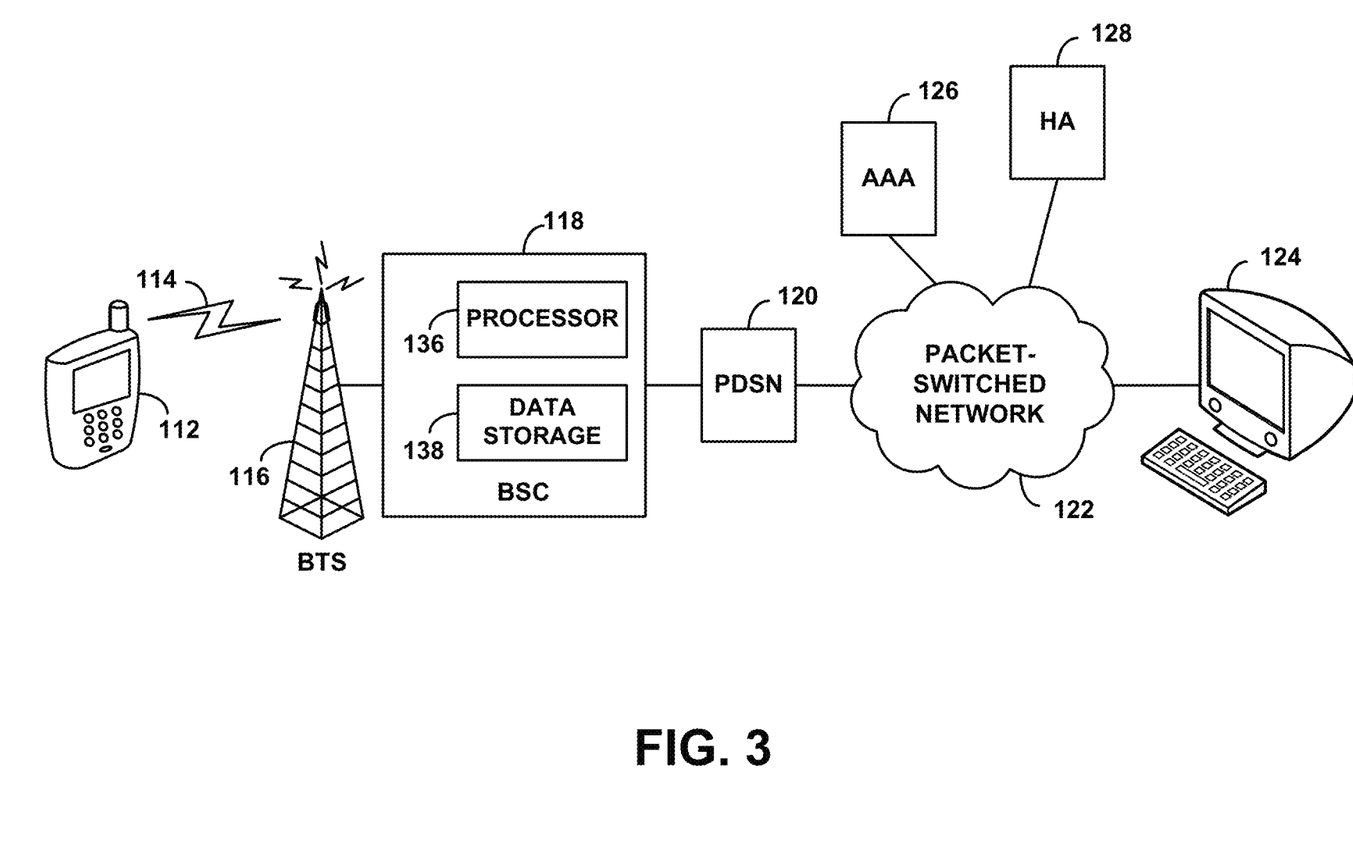
FIG. 3 is a simplified block diagram of an example cellular wireless communication system in which the method can be implemented.

FIG. 3 depicts an example cellular wireless communication system adapted to provide wireless packet data communication service for a mobile station 112. Mobile station 12 communicates over an air interface 114 with a BTS 116, which is then coupled or integrated with a BSC 118. BSC 118 is then coupled with a PDSN 120, which provides connectivity with a packet-switched network 122 such as the Internet and/or a wireless carrier's private core packet-network. Sitting as nodes on network 122 are, by way of example, a remote computer 124, an authentication, authorization, and accounting (AAA) server 126, and a mobile-IP home agent (HA) 128.

With this arrangement, after being authenticated by AAA server 126, HA 128 may assign an IP address for use by mobile station 112, and mobile station 112 may then engage in packet-data communications with entities such as remote computer 124, via a communication path comprising air interface 114, BTS 116, BSC 118, PDSN 120, and network 122.

Figure 4:
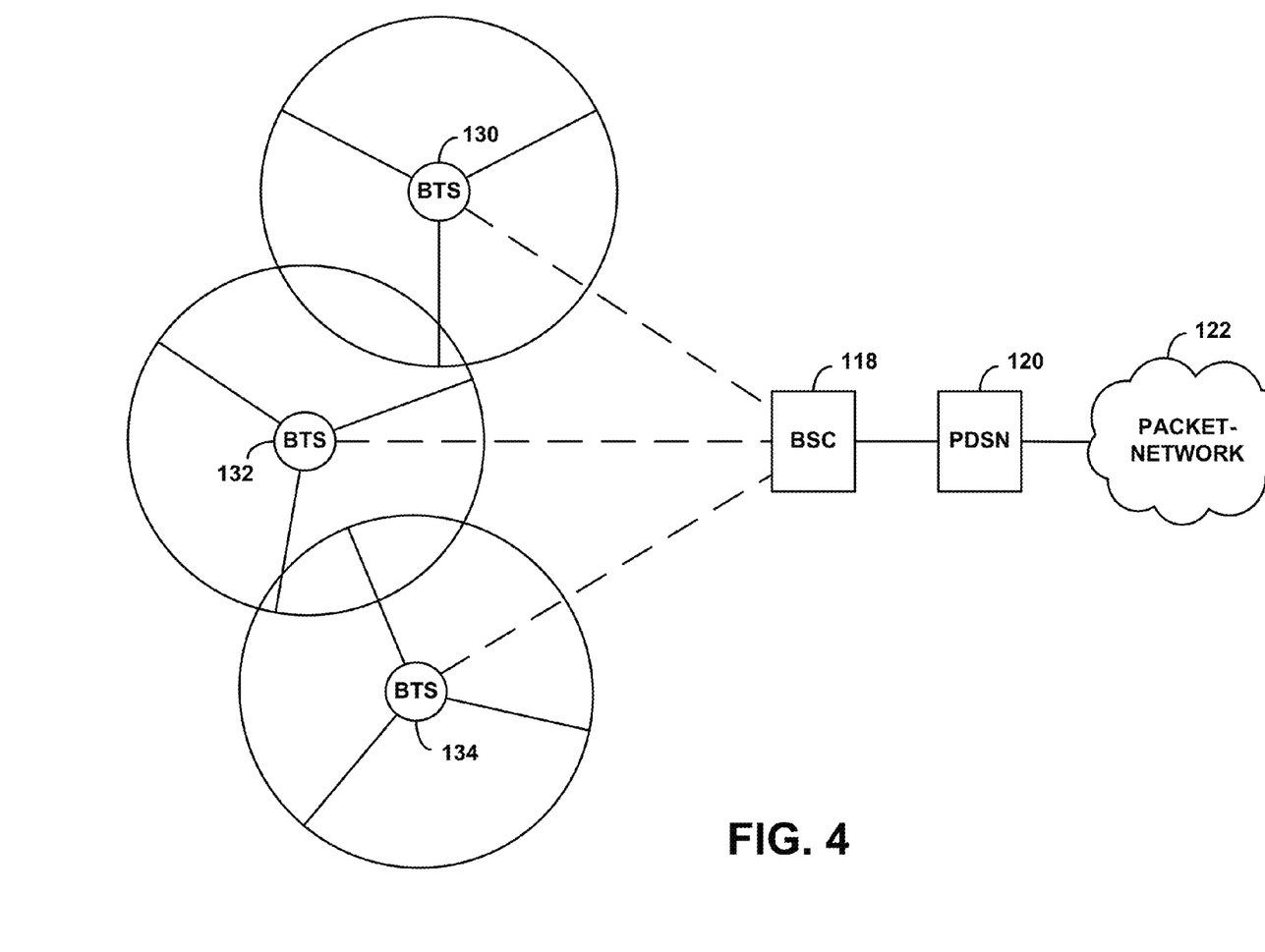
FIG. 4 is another simplified block diagram of a wireless communication system in which the method can be implemented.

In practice, BSC 118 may serve multiple BTSs. Each BTS may then radiate to define a given cell and a plurality of cell sectors. FIG. 4 illustrates this arrangement. As shown in FIG. 4, BSC 118 is coupled with three BTSs 130, 132, 134. Each BTS is shown at the core of a respective circle representing a cell, and each cell is divided into three pie-pieces representing sectors. With this arrangement, a mobile station can operate in any of the sectors and can communicate on packet network 122 via its serving BTS, and via BSC 118 and PDSN 120.

At times in this description, the term "base station" may refer to a radio access network element such as a BTS, a BSC, or combination BTS/BSC, for instance. A base station may include other elements and may take other forms as well. The term "radio network controller" (RNC) may also be used to refer to a BSC or more generally to a base station, usually in the context of IS-856 communications.

Preferably, the present method will be carried out by a base station, such as by BSC 118 for instance. In this regard, FIG. 3 shows that BSC 118 includes a processor 136 and data storage 138. Processor 136 may comprise one or more general purpose processors (e.g., microprocessors) and/or one or more dedicated, special-purpose processors (e.g., DSP chips, or the like). Data storage 138, in turn, may comprise one or more volatile and/or non-volatile data storage components (e.g., magnetic, optical, and/or organic storage) and may be integrated or connected with processor 136. As further shown, data storage 138 preferably contains program instructions 140 that define one or more routines executable by processor 136 to carry out various functions described herein. (As such, the processor, data storage, and/or instructions may be considered to define means for carrying out the various functions.)

b. Legacy CDMA Communications

In a conventional or "legacy" Code Division Multiple Access ("CDMA") wireless network compliant with the well known industry standards TIA/EIA/IS-95 and TIA/EIA/IS-2000, each cell employs one or more carrier frequencies, typically 1.25 MHz each, and each sector is distinguished from adjacent sectors by a pseudo-random number offset ("PN offset"). Further, each sector can concurrently communicate on multiple different channels, distinguished by "Walsh codes". When a mobile station operates in a given sector, communications between the mobile station and the BTS of the sector are carried on a given frequency and are encoded by the sector's PN offset and a given Walsh code.

Air interface communications are divided into forward link communications, which are those passing from the base station to the mobile station, and reverse link communications, which are those passing from the mobile station to the base station. In an IS-95 or IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

With this arrangement, a mobile station can be arranged to engage in packet-data communications. To do so, the mobile station first sends a packet-data origination request over the access channel and via the BTS 116 and BSC 118 to an MSC (not shown). The MSC then signals back to the BSC directing the BSC to assign an air interface traffic channel for use by the mobile station, and the BSC signals to the PDSN 120. The PDSN 120 and mobile station 112 then negotiate to establish a data link layer connection, such as a point to point protocol (PPP) session. Further, the PDSN 120 sends a foreign agent challenge message to the mobile station, and the mobile station responds with a mobile-IP registration request (MIP RRQ), which the PDSN forwards to HA 128. The HA then assigns an IP address for the mobile station to use, and the PDSN passes that IP address via the BSC to the mobile station.

Once the mobile station has a radio link (an assigned traffic channel), a data link, and an IP address, the mobile station is considered to be in an "active" mode. To conserve air interface resources, however, an IS-2000 system is typically arranged to release the mobile station's assigned traffic channel after a certain amount of time during which no data traffic passes to or from the mobile station through the PDSN. Upon release of the mobile station's radio link, the mobile station is considered to be in a "dormant" mode, in which it lacks a radio link but still has a data link and an IP address.

While in the dormant mode, if the mobile station seeks to transmit packet-data from its IP address, the mobile station would re-acquire a radio link by sending a new origination request message to the BSC. Similarly, if the PDSN receives packet-data destined for the IP address of a dormant mobile station, the PDSN would notify the BSC, the BSC would page the mobile station to cause the mobile station to then re-acquire a radio link, and the PDSN would then pass the data along to the mobile station.

Under IS-95 and IS-2000, a mobile station can communicate with a number of "active" sectors at a time. (The term "active" in this context should not be confused with the same term used to describe data communication state as noted above.) Depending on the system, the number of active sectors can be up to three or six (currently). The mobile station receives largely the same signal from each of the active sectors and, on a frame-by-frame basis, selects the best signal to use.

A mobile station maintains in its memory a list of the sectors in its "active" set. In addition, it maintains in its memory a list of "candidate" sectors (typically up to six), which are those sectors that are not yet in the active set but that have sufficient signal strength that the mobile station could demodulate signals from those sectors. Further, the mobile maintains a list of "neighbor" sectors, which are those sectors not in the active set or candidate set but are in close vicinity to the mobile station. All other possible sectors are considered members of a "remaining" set.

To facilitate a determination of which sectors should be in the mobile station's "active" set, all base stations emit a pilot channel signal in each sector, typically at a power level higher than other forward link signals. A mobile station then constantly measures the strength of each pilot that it receives and notifies a primary base station (a base station currently serving the mobile station) when pilot strength falls above or below designated thresholds. The base station, in turn, provides the mobile station with an updated list of active pilots.

More particularly, in legacy systems, the base station initially provides the mobile station with a Handoff Direction Message (HDM), which indicates (i) the PN offsets of the sectors in the active set and (ii) various handoff parameters that relate to pilot signal strength. Additionally, the base station initially provides the mobile station with a Neighbor List Update Message (NLUM), which identifies the "neighbor" sectors for the current active set.

The mobile station then monitors all of the pilot signals that it receives, and the mobile station determines if any neighbor pilot exceeds a designated threshold strength. If so, the mobile station adds the pilot to its "candidate" set and sends a Pilot Strength Measurement Message (PSMM) to the base station, indicating the estimated $E_c/I_o$ for the pilot. Depending on current capacity and other issues, the base station may then send an HDM to the mobile station, listing the pilot as a new member of the active set. Upon receipt of the HDM, the mobile station then adds the pilot to its active set as instructed, and the mobile station sends a Handoff Completion Message (HCM) to the base station, acknowledging the instruction, and providing a list of the pilots (PN offsets) in its active set.

Similarly, if the mobile station detects that the signal strength of a pilot in its active set drops below a designated threshold, the mobile station starts a handoff drop timer. If the timer expires, the mobile station then sends a PSMM to the base station, indicating the $E_c/I_o$ and drop timer. The base station may then respond by sending an HDM to the mobile station, without the pilot in the active set. The mobile station would then receive the HDM and responsively move the pilot to its neighbor set and send an HCM to the base station.

c. High Rate Packet-Data Communications

Under IS-2000, the highest rate of packet-data communications theoretically available on a fundamental traffic channel of the forward link is 9.6 kbps (under "Radio Configuration 3" (RC3), which provides 64 Walsh codes per sector) or 19.2 kbps (under RC4, which provides 128 Walsh codes per sector). In order to provide higher rate packet-data service to support higher bandwidth applications, the industry has introduced a new "high rate packet data (HRPD) system," which is defined by industry standard IS-856.

IS-856 leverages the asymmetric characteristics of most IP traffic, in which the forward link typically carries a heavier load than the reverse link. Under IS-856, the forward link uses time division multiplexing (TDM), in order to allocate all power in a sector to a given user at any moment, while the reverse link may retain largely the traditional IS-2000 code division multiplexing (CDM) format, albeit with the addition of a "data rate control" (DRC) channel used to indicate the supportable data rate and best serving sector for the forward link. Alternatively, in further versions of IS-856, a more advanced reverse link may be provided as well. In any event, the end result is that a mobile station operating under IS-856 can, in theory, receive packet-data at a rate of at least 38.4 kbps and up to 2.4 Mbps.

The IS-856 forward link is divided into time slots of length 2048 chips, and each time slot is further time division multiplexed to carry various channels, including a pilot channel, a Media Access Control (MAC) channel, and, if any traffic exists, a forward traffic channel and a "control" channel. As in IS-2000, each sector in IS-856 is defined by a PN offset, and the pilot channel carries an indication of the sector's PN offset. Also as in IS-2000, a mobile station operating under IS-856 monitors the pilot signal emitted by various sectors as a basis to facilitate active set management, i.e., to facilitate handoff from one sector to another.

IS-856 introduces a "virtual soft handoff" concept, in which a mobile station communicates with the network on just a "best" sector of its active set at any given time. As in IS-2000, the mobile station monitors the signal strength of pilot signals emitted by various sectors, and the mobile station uses threshold handoff parameters such as those noted above as a basis to trigger the addition of a sector to the mobile station's candidate set. Further as in IS-2000, the mobile station then sends a revised candidate set to the network, and the network decides whether to revise the mobile station's active set. If the network decides to update the mobile station's active set, the network sends an HDM to the mobile station and further instructs each sector to communicate with the mobile station.

Unlike IS-2000 in which forward traffic information is routed to all sectors in the mobile station's active set, however, forward traffic under IS-856 is routed to only a "best" sector that the mobile station selects from its active set, typically the sector that has the strongest pilot signal (or, more particularly, the highest signal to noise ratio (C/I)). In practice, the mobile station will monitor the pilot signals of the sectors in its active set, and will include in its DRC (on the reverse link) an indication of the selected serving sector. Only that sector will then serve the mobile station with forward link packets. Thus, a mobile station may quickly hand off from one IS-856 serving sector to another by simply instructing the base station which sector it intends to communicate with.

Further, the mobile station will select a data rate based on the C/I that it measures for the selected sector, and the mobile station will include in its DRC a request to receive forward link communications at that data rate. IS-856 defines a substantially fixed mapping between C/I and DRC data rate values, such that particular ranges of C/I will by definition lead to particular DRC values. According to IS-856, the higher the C/I, the higher the requested data rate, and the lower the C/I, the lower the requested data rate. This relationship stems from the fact that stronger signal quality should facilitate quicker transmission (with less need for retransmission).

Upon receipt of the DRC from the mobile station, the base station will then generally grant the requested data rate for forward link transmission to the mobile station. As air interface conditions change, however, it may be the case that the actual rate of data transmission begins to exceed or fall below the requested/granted data rate.

To acquire packet data connectivity under IS-856, after a mobile station first detects an IS-856 carrier, the mobile station sends to its BSC (or "RNC") 118 a UATI Request, and receives in response in a UATI Assignment message an International Mobile Station Identifier (IMSI) (i.e., a type of UATI), which the mobile station can then use to identify itself in subsequent communications with the BSC. The mobile station then sends a Connection Request to the BSC 118, and the BSC responsively invokes a process to authenticate the mobile station and to have the mobile station acquire a data link, through interaction with a AAA server for instance (possibly different than the AAA server 126 shown in FIG. 3).

The BSC 118 further checks on resource availability and, if appropriate, then sends a Traffic Channel Assignment message to the mobile station, directing the mobile station to use a particular MAC ID. From that point forward, the mobile station may then look for forward link communications coded to be directed to that MAC ID and, upon receiving such communications, may process them as communications directed to the mobile station. Further, the BSC 118 may direct the mobile station to use particular reverse link resources, by providing one or more reverse link channel parameters to the mobile station.

Additionally, the BSC signals to the PDSN 20, and the PDSN and mobile station then negotiate to establish a PPP data link. In addition, as in the IS-2000 process, the mobile station then sends an MIP RRQ to the PDSN, which the PDSN forwards to the HA 128, and the HA assigns a mobile-IP address for the mobile station to use.

As in IS-2000, once the mobile station has acquired an IS-856 radio link, a data link, and an IP address, the mobile station is considered to be in an active mode. In the active mode, the mobile station is given full use of the sector power in its assigned time slot, i.e., each time its time slot occurs, which facilitates higher rate data communication. Further, as in IS-2000, if the mobile station does not send or receive data for a defined period of time, the mobile station enters a dormant mode. In the dormant mode, an IS-856 system maintains the logical state of the mobile station's session (e.g., IP address, PPP state, and radio link session information), while releasing the mobile station's radio link resources (e.g., the time slot that had been assigned for use by the mobile station). With the maintained session state, the mobile station can quickly re-acquire a radio link so as to send or receive packet data, thereby giving the appearance that the mobile station is "always on."

d. Hybrid IS-2000/IS-856 Systems

Given the proliferation of legacy IS-2000 systems, IS-856 was designed to be backwards compatible and to facilitate "hybrid" operation. A "hybrid access terminal," in this scenario, is defined as a mobile station that can operate on both IS-2000 and IS-856 networks. A typical hybrid terminal, for instance, may be capable of receiving voice, short message service (SMS) messages, and dedicated channel data services on IS-2000 networks, as well as high-speed packet data service on IS-856 networks.

In a hybrid system, IS-2000 and IS-856 coverage are provided on different carrier frequencies, each of which is 1.25 MHz in bandwidth for consistency with legacy operation. Further, IS-856 systems are typically provided as overlays on existing IS-2000 systems such that a given coverage area may have both IS-856 and IS-2000 coverage. In practice, a given BSC may then provide either IS-2000 coverage or both IS-2000 and IS-856 coverage. For an IS-2000 sector, the BSC may have just an IS-2000 circuit card/module. For a hybrid IS-2000/IS-856 sector, on the other hand, the BSC may have both an IS-2000 circuit card/module to facilitate IS-2000 operation and an IS-856 circuit card/module to facilitate IS-856 operation. Alternatively, discrete IS-2000 BSCs and IS-856 BSCs (RNCs) could be provided.

A typical hybrid device will be programmed to use an IS-856 data connection when faced with the choice between IS-856 and IS-2000, i.e., when in a hybrid sector.

By standard design, when a hybrid terminal is operating in an IS-856 system, it will also periodically monitor the control channels in the IS-2000 system, in search of any incoming voice calls, SMS messages, or the like, and to monitor IS-2000 pilot signals. In the active IS-856 mode, the terminal periodically (e.g., every 5 seconds) tunes to the frequency of the IS-2000 system to monitor the IS-2000 control channels and then tunes back to the IS-856 frequency to resume the active data session. In the dormant/idle IS-856 mode, the terminal operates in a slotted manner to monitor both the IS-856 control channel and the IS-2000 control channels.

Further, because IS-856 is typically provided as an overlay on an existing IS-2000 system, it is possible that a hybrid terminal may need to hand off from a hybrid sector (providing both IS-2000 and IS-856 coverage) to an IS-2000 sector (providing no IS-856 coverage), e.g., as it moves physically out of a hybrid sector and into an IS-2000 sector. To be able to facilitate such a handoff, when a hybrid terminal is operating in IS-856 it will simultaneously maintain an IS-2000 active set (as will the IS-2000 BSC) as described above. In particular, as the terminal periodically tunes to the IS-2000 frequency, it will monitor the IS-2000 pilots, consider the various threshold parameters described above, send PSMM messages as applicable to the IS-2000 BSC, and receive HDM messages as applicable from the IS-2000 BSC. Thus, when the terminal seeks to hand off from IS-856 to IS-2000, the terminal can readily switch over to operating on one or more of the sectors currently in its IS-2000 active set.

In a hybrid system, handoff from IS-856 to IS-2000 is generally triggered by an analysis of power the C/I ratios of the available IS-856 sectors. In particular, a hybrid terminal will, as noted above, regularly monitor the C/I of available sectors. If the terminal detects that the lowest available C/I is lower than a threshold "PILOT-DROP" level, then the terminal will leave the IS-856 system and begin operating in the IS-2000 system.

If this IS-856 to IS-2000 handoff occurs when the terminal is in an idle/dormant IS-856 mode, then the terminal will simply register in the IS-2000 system and drop its IS-856 radio link. That is, the terminal may request packet data connectivity in the IS-2000 system and consequently obtain an IS-2000 radio link. Further, because the same PDSN and mobile-IP home agent likely serves both the IS-2000 and IS-856 systems, the terminal may simply maintain its existing PPP session and mobile-IP address. As one way to accomplish this in practice, when the terminal acquires an IS-2000 radio link and sends a MIP RRQ to the PDSN, the terminal can include its already-assigned mobile-IP address within the MIP RRQ. When the PDSN receives the MIP RRQ and detects that the terminal already has a mobile-IP address, the PDSN would forego sending the MIP RRQ to HA 128. Instead, the PDSN would responsively work with the IS-2000 BSC (e.g., a packet control function (PCF) of the BSC) to set up a new radio-packet (R-P) tunnel for the IS-2000 connection and would tear down the R-P tunnel that it had with the IS-856 BSC (PCF).

If the IS-856 to IS-2000 handoff occurs when the terminal is in an active IS-856 mode, on the other hand, the terminal will first switch to an IS-856 dormant mode and will then acquire dedicated packet-data connectivity in the IS-2000 system in the manner described in the preceding paragraph.

It is also possible that a hybrid terminal operating on an IS-2000 system may hand off from an IS-2000 sector to a hybrid sector. In this regard, when a hybrid terminal is in an idle/dormant IS-2000 state, the terminal will perform periodic off-frequency searches in an effort to discover existing IS-856 systems. If the terminal thereby finds an IS-856 system, it will acquire IS-856 packet-data connectivity and then operate in the IS-856 system as described above. Existing standards generally do not permit a hybrid terminal that is in an active IS-2000 mode to hand off to IS-856, mainly because, in the active IS-2000 mode, no provision is made for discovering co-existing IS-856 systems. However, once the terminal switches to an IS-2000 dormant mode, it may then lock onto an IS-856 system as described above.

When in an idle IS-2000 mode, if a hybrid terminal locks onto an IS-856 system and acquires packet-data connectivity, the terminal will apply the conventional packet-data connection process, including acquiring an IS-856 radio link, and a PPP link and IP address. When in a dormant IS-2000 mode, the terminal will also apply the conventional packet-data connection process, but, as with a handoff from IS-856 to IS-2000, the terminal may only need to acquire an IS-856 radio link, as the PDSN may recognize that the terminal already has an assigned IP address.

e. Improved Vertical Handoff between IS-2000 and IS-856

The present method advances over the state of the art by providing for improved vertical handoff, preferably avoiding the need for a mobile station to transition from active to dormant mode in order to achieve a handoff from IS-2000 to IS-856. In preferred implementation, the method operates as follows, with corresponding steps illustrated by FIG. 5.

Figure 5:
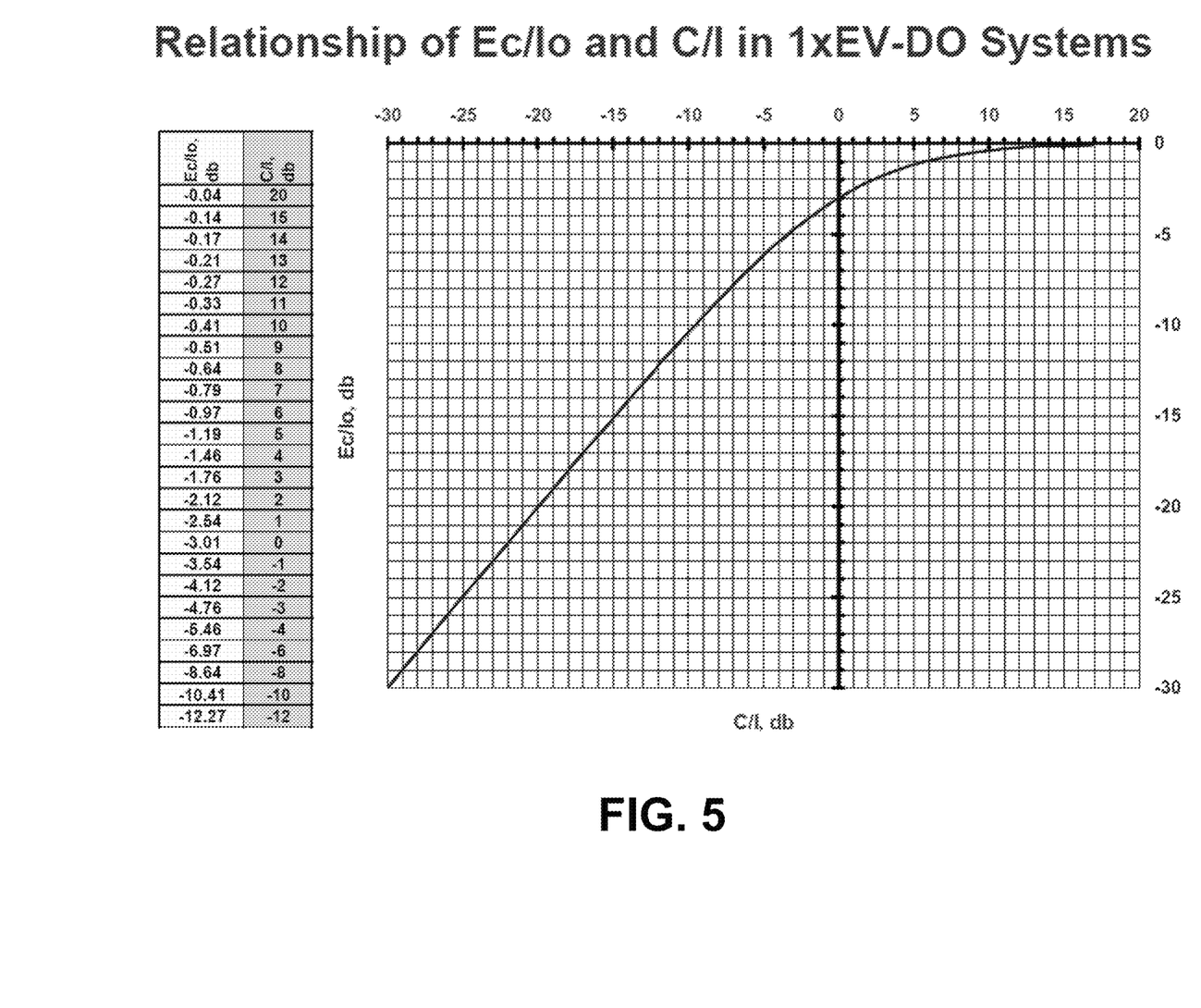
FIG. 5 is a table and chart depicting mapping between $E_c/I_o$ and C/I values for use in the exemplary method.

First, the example method assumes that the IS-2000 system has assigned an IS-2000 traffic channel to the mobile station and that the mobile station is thus in the active IS-2000 mode. Thus, the mobile station has an IS-2000 radio link 150 with the IS-2000 BSC, the IS-2000 BSC has a radio-packet (RP) link 152 with the PDSN, and the mobile station has a PPP link 154 with the PDSN.

While the mobile station is in that mode, or over the course of time while the IS-2000 system is serving the mobile station, the IS-2000 BSC (e.g., an IS-2000 logic module of the BSC) will track the data rate at which the IS-2000 RAN has actually been transmitting data to the mobile station, indicated by the rate of output of such data from the BSC's buffer for instance. Further, the IS-2000 BSC will track the $E_c/I_o$ reported by the mobile station, as a rolling average for instance. And the IS-2000 BSC will use this data to determine if a handoff trigger exists.

Figure 6:
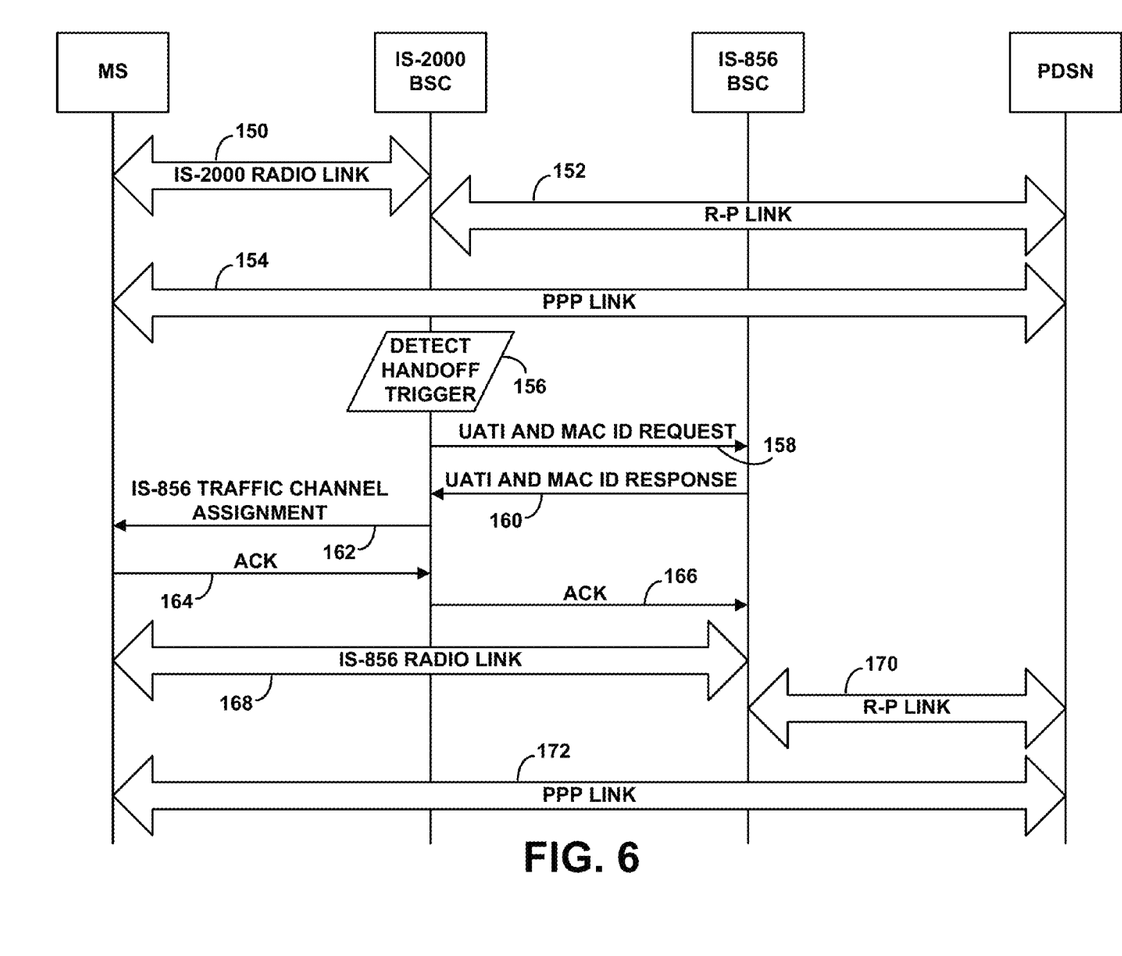
FIG. 6 is a message flow diagram depicting example operation of the method for vertical handoff between IS-2000 and IS-856.

In the preferred method, the IS-2000 BSC will map the $E_c/I_o$ of the mobile station to a corresponding IS-856 C/I value and will map the C/I value to a corresponding IS-856 DRC data rate value indicative of the forward link data rate the mobile station is likely to receive under IS-856. The mapping of $E_c/I_o$ to C/I values can be done using a standard relationship, considering that the C/I will likely be higher as the $E_c/I_o$ is higher—particularly if the IS-2000 and IS-856 systems share a common antenna configuration—but also considering that the C/I will likely be a magnitude higher (in db) than the $E_c/I_o$. FIG. 6 is a table and chart depicting example correlations between $E_c/I_o$ and C/I values, which the IS-2000 BSC could apply in order to map a given $E_c/I_o$ value to a corresponding C/I value. In turn, the BSC may then map the C/I value to a corresponding DRC data rate value using the standard mapping between C/I and DRC values as provided by IS-856.

On a regular basis (e.g., as a continuous thread running in the background), the IS-2000 BSC will then compare the mobile station's actual IS-2000 forward link data rate with the predicted IS-856 forward link data rate, to determine whether the predicted data rate exceeds the actual data rate by at least a threshold extent. The threshold is matter of design choice. Further, in a robust embodiment, the IS-2000 BSC will apply a hysteresis timer, requiring the predicted IS-856 data rate to exceed the actual IS-2000 data rate by at least the threshold extent for a threshold time period, in order to avoid false triggering.

When the IS-2000 BSC detects that the predicted IS-856 data rate sufficiently exceeds the actual IS-2000 data rate, the IS-2000 BSC may consider vertical handoff to IS-856 to be triggered, as shown at step 156. Alternatively, the IS-2000 BSC may consider other factors in addition to or instead of data rate as elements of the vertical handoff trigger. Other factors include a comparison of signal strength, error rate, for instance, possibly comparing metrics of the mobile station under IS-2000 with metrics of other similarly situated mobile stations under IS-856. Threshold conditions (e.g., comparisons) of such metrics could be used alone or in combination with data rate to constitute a vertical handoff trigger.

Upon detecting the vertical handoff trigger, the IS-2000 BSC will then invoke a process to obtain assignment of an IS-856 traffic channel for the mobile station, notwithstanding the fact that the mobile station has not requested such assignment with respect to this handoff. In particular, at step 158, the IS-2000 BSC will send to the IS-856 BSC (via an A21 link for instance) a UATI and MAC ID Request message (or a UATI request followed by a MAC ID request), identifying the mobile station at issue by its mobile identification number or other identifier.

The IS-856 BSC then maps the mobile station to an existing UATI if one exists already or authenticates the mobile station and assigns a new UATI if one does not yet exist. (Alternatively, if a UATI does not yet exist for the mobile station, the IS-856 may be programmed to reject the request from the IS-2000 BSC). At step 160, the IS-856 BSC then sends to the IS-2000 BSC (via an A21 link for instance) a UATI and MAC ID Response message specifying the assigned UATI and MAC ID for the mobile station.

At step 162, the IS-2000 then transmits to the mobile station, via the IS-2000 radio link, an IS-856 traffic channel assignment message carrying the assigned UATI and MAC ID as a directive for the mobile station to switch to that IS-856 traffic channel. In this regard, notice that the parameters provided (at least the MAC ID) define the specific traffic channel, rather than just generally characterizing the IS-856 frequency. Thus, the mobile station can readily switch over to begin communicating on the indicated IS-856 traffic channel without the need to request assignment of the traffic channel.

At step 164, the mobile station then sends a traffic channel assignment acknowledgement message via IS-2000 to the IS-2000 BSC. And at step 166, the IS-2000 BSC then sends a corresponding acknowledgement message to the IS-856 BSC, to alert the IS-856 BSC that the handoff is being completed. In response (if not earlier), the IS-856 may then apply conventional procedures to set up a new R-P link with the PDSN. Thus, the mobile station can readily begin communication on the assigned IS-856 radio link 168, the IS-856 BSC would have an R-P link with the PDSN, and the mobile station would maintain its PPP link 172 with the PDSN.

An exemplary embodiment has been described above. Those skilled in the art will understand, however, that changes and modifications may be made to this embodiment without departing from the true scope and spirit of the claims, including their equivalents.

What is claimed is:

1. A method operable in a wireless communication system having a plurality of radio access networks ("RANs") serving air interface traffic channels defined by disparate air interface protocols, including a first RAN serving air interface traffic channels according to a first air interface protocol ("first protocol traffic channels") and a second RAN serving air interface traffic channels according to a second air interface protocol ("second protocol traffic channels"), the method comprising:

while a mobile station has a first protocol traffic channel served by the first RAN, the first RAN detecting a handoff trigger for handoff of the mobile station to the second RAN and responsively (i) requesting the second RAN to assign a second protocol traffic channel for the mobile station, (ii) receiving from the second RAN one or more parameters defining the second protocol traffic channel assigned by the second RAN for the mobile station, and (iii) transmitting to the mobile station via the first protocol traffic channel the one or more parameters without the mobile station having requested assignment of the second protocol traffic channel and without the mobile station having searched for coverage under the second air interface protocol to trigger the handoff, whereby the one or more parameters are usable by the mobile station to readily switch over from communication on the first protocol traffic channel to communication on the second protocol traffic channel.

2. The method of claim 1, wherein the first and second air interface protocols are each selected from the group consisting of CDMA, GSM, UMTS, WiMAX, LTE.

3. The method of claim 1, wherein the first air interface protocol comprises IS-2000 and the second air interface protocol comprises IS-856.

4. The method of claim 3, wherein the one or more parameters comprise a Unicast Access Terminal Identifier ("UATI").

5. The method of claim 4,
wherein requesting the second RAN to assign a second protocol traffic channel for the mobile station comprises sending a UATI Request to the second RAN, and
wherein receiving the one or more parameters from the second RAN comprises receiving from the second RAN a UATI Assignment providing the UATI.

6. The method of claim 4, wherein the one or more parameters comprise a Media Access Control (MAC) ID.

7. The method of claim 6,
wherein requesting the second RAN to assign a second protocol traffic channel for the mobile station comprises sending a Connection Request with the UATI to the second RAN and receiving the MAC ID in response from the second RAN.

8. The method of claim 1, wherein the first air interface protocol comprises an air interface protocol according to which when the mobile station has an active air interface connection, the mobile station does not search for coverage under the second air interface protocol.

9. The method of claim 1, wherein the first RAN includes a base station controller ("BSC") that controls air interface communications according to the first air interface protocol and being communicatively linked with a transport network, and wherein the second RAN includes a radio network controller ("RNC") that controls air interface communications according to the second air interface protocol and being communicatively linked with the transport network, and wherein:

the first RAN detecting the handoff trigger comprises the BSC detecting the handoff trigger; and the first RAN requesting the second RAN to assign a second protocol traffic channel for the mobile station and receiving the one or more parameters from the second RAN comprises the BSC requesting the RNC to assign a second protocol traffic channel for the mobile station and receiving the one or more parameters from the RNC.

10. The method of claim 9, wherein the BSC and RNC are both communicatively linked to a common Packet Data Serving Node ("PDSN"), the method further comprising:
buffering data in the PDSN to facilitate handoff of the mobile station from the first protocol traffic channel to the second protocol traffic channel.

11. The method of claim 1, further comprising providing the first RAN and second RAN in an overlay configuration.

12. The method of claim 1, wherein the handoff trigger comprises a data-rate based handoff trigger, wherein detecting the handoff trigger comprises:
determining actual data rate for the mobile station on the first air interface protocol;
predicting data rate for the mobile station on the second air interface protocol; and
comparing determined actual data rate with the predicted data rate and determining that the predicted data rate exceeds the determined actual data rate by a threshold.

13. The method of claim 12, wherein predicting data rate for the mobile station on the second air interface protocol comprises:
determining signal strength received by the mobile station on the first air interface protocol; and
mapping the determined received signal strength on the first air interface protocol to a prediction of data rate on the second air interface protocol.

14. A method operable in a wireless communication system having a plurality of radio access networks ("RANs") providing air interface connectivity under disparate air interface protocols, including a first RAN providing air interface connectivity under a first air interface protocol ("first air interface protocol connections") and a second RAN providing air interface connectivity under a second air interface protocol ("second air interface protocol connections"), the method comprising, while a mobile station has a first air interface protocol connection served by the first RAN:
the first RAN detecting a handoff trigger for handoff of the mobile station to the second RAN;
responsive to detecting the handoff trigger, the first RAN (i) requesting the second RAN to assign a second air interface protocol connection for the mobile station, (ii) receiving from the second RAN one or more parameters defining the second air interface protocol connection assigned by the second RAN for the mobile station, and (iii) transmitting to the mobile station via the first air interface protocol connection the one or more parameters without the mobile station having requested assignment of the second air interface protocol connection and without the mobile station having searched for coverage under the second air interface protocol to trigger the handoff,
whereby the one or more parameters are usable by the mobile station to readily switch over from communication on the first air interface protocol connection to communication on the second air interface protocol connection.

15. A radio access system operable to serve a mobile station with an air interface connection defined by a first air interface protocol ("first air interface protocol connection"), wherein the radio access system comprises:
at least one antenna structure for engaging in air interface communication with the mobile station; and
control logic for controlling one or more aspects of the air interface communication,
wherein the control logic is operable to assign the first air interface protocol connection to the mobile station,
wherein the control logic is operable to detect a handoff trigger for handoff of the mobile station to a second air interface protocol and to responsively (i) request another radio access system to assign for use by the mobile station an air interface connection defined by the second air interface protocol ("second air interface protocol connection"), (ii) receive from the other radio access system one or more parameters defining the second air interface protocol connection assigned by the other radio access system for use by the mobile station, and (iii) transmit to the mobile station via the first air interface protocol connection the one or more parameters without the mobile station having requested assignment of the second air interface protocol connection and without the mobile station having searched for coverage under the second air interface protocol to trigger the handoff,
whereby the one or more parameters are usable by the mobile station to readily switch over from the first air interface protocol connection to the second air interface protocol connection.

16. The radio access system of claim 15, wherein the first and second air interface protocols are each selected from the group consisting of CDMA, GSM, UMTS, WiMAX, and LTE.

17. The radio access system of claim 15, wherein the control logic is disposed in a base station controller ("BSC") that is communicatively linked with a Packet Data Serving Node ("PDSN") providing connectivity with a packet-switched network, and wherein the other radio access system includes a radio network controller ("RNC") also communicatively linked with the PDSN.

18. The radio access system of claim 15, wherein the radio access system and the other radio access system are arranged in an overlay configuration.

19. The radio access system of claim 15, wherein the handoff trigger is a data-rate based handoff trigger, wherein the control logic detects the handoff trigger by comparing actual data rate provided to the mobile station under the first air interface protocol with predicted data rate for the mobile station under the second air interface protocol.

20. The radio access system of claim 19, wherein the control logic determines the actual data rate provided to the mobile station under the first air interface protocol, the control logic determines a signal strength indication for the mobile station under the first air interface protocol, maps the determined signal strength indication to a predicted data rate under the second air interface protocol, and the control logic compares the predicted data rate with the determined actual data rate to determine whether the predicted data rate exceeds the determined actual data rate by at least a threshold extent.

* * * * *